US 6,751,615 B2
Jun. 15, 2004

(12) United States Patent
Nisler et al.

(10) Patent No.: US 6,751,615 B2
(45) Date of Patent: Jun. 15, 2004

(54) METHOD AND SYSTEM GENERATING QUERY FORM, ASSIGNING AND COMPARING RISK DESIGNATION OF CHEMICAL PRODUCT OVER A COMPUTER NETWORK FOR CHEMICAL PRODUCTS CUSTOMERS

(75) Inventors: Thomas E. Nisler, St. Charles, IL (US); David Mack, Garden City, MI (US)

(73) Assignee: Aspen Technology, Inc., Cambridge, MA (US)

( * ) Notice: Subject to any disclaimer, the term of this patent is extended or adjusted under 35 U.S.C. 154(b) by 295 days.

(21) Appl. No.: 09/846,403

(22) Filed: May 1, 2001

(65) Prior Publication Data

US 2003/0037062 A1 Feb. 20, 2003

Related U.S. Application Data

(60) Provisional application No. 60/201,046, filed on May 1, 2000.

(51) Int. Cl.⁷ .................................................. G06F 17/30
(52) U.S. Cl. ................................ 707/5; 707/3; 707/10; 700/79; 700/91; 702/22; 702/30; 703/12; 705/26; 705/28; 705/38; 706/925
(58) Field of Search ................ 705/1–40; 706/925; 703/12; 702/6–12, 22–23, 27–31; 707/1–10, 100–104.1, 200–205; 700/233, 240, 324, 266, 79–80, 91; 709/220

(56) References Cited

U.S. PATENT DOCUMENTS

| 4,347,568 A | 8/1982 | Giguere et al. ............. 364/300 |
| 5,311,437 A | 5/1994 | Leal et al. .................. 364/468 |
| 5,311,438 A | 5/1994 | Sellers et al. ............... 364/468 |
| 5,577,120 A | 11/1996 | Penzias ...................... 380/23 |
| 5,644,693 A | * 7/1997 | Fitzgerald et al. .......... 345/835 |
| 5,664,112 A | 9/1997 | Sturgeon et al. .............. 705/28 |
| 5,671,279 A | 9/1997 | Elgamal ....................... 380/23 |
| 5,712,990 A | 1/1998 | Henderson ................... 395/228 |
| 5,715,402 A | * 2/1998 | Popolo ......................... 705/37 |
| 5,726,884 A | 3/1998 | Sturgeon et al. ............. 395/209 |
| 5,737,726 A | * 4/1998 | Cameron et al. .............. 705/7 |
| 5,790,677 A | 8/1998 | Fox et al. ..................... 380/24 |
| 5,806,043 A | * 9/1998 | Toader ......................... 405/14 |
| 5,847,957 A | * 12/1998 | Cohen et al. ................. 700/108 |
| 5,903,878 A | 5/1999 | Talati et al. .................. 705/26 |
| 5,950,192 A | * 9/1999 | Moore et al. .................. 707/3 |
| 5,970,475 A | 10/1999 | Barnes et al. ................. 705/27 |
| 6,012,016 A | * 1/2000 | Bilden et al. ................. 702/12 |
| 6,021,362 A | * 2/2000 | Maggard et al. ............. 700/234 |

(List continued on next page.)

FOREIGN PATENT DOCUMENTS

| EP | 1028386 | * 8/2000 | |
| EP | 1043667 A2 | * 10/2000 | ........... G06F/17/60 |
| WO | WO00/79417 A2 | * 12/2000 | |
| WO | WO012/0525 A1 | * 3/2001 | |

*Primary Examiner*—Srirama Channavajjala
(74) *Attorney, Agent, or Firm*—Hamilton, Brook, Smith & Reynolds, P.C.

(57) ABSTRACT

The present invention relates to a system and a method of screening potential customers of chemical products for safe practices related to the chemicals that they wish to purchase or otherwise obtain from manufacturers and/or distributors. A customer may order chemical products on-line that may be are categorized based upon the degree of hazard they pose. The customer may be presented with a query form when the customer orders a chemical product for the first time. The query is designed to include allow the customer to provide information concerning the preparedness of the customer should an emergency with the product arise. Moreover, the customer may automatically affirm that the responses to the query form are true and correct. A reviewer may determine whether the product order should be approved or rejected. If approved, the order is finalized.

30 Claims, 3 Drawing Sheets

U.S. PATENT DOCUMENTS

| | | | | |
|---|---|---|---|---|
| 6,029,141 A | * | 2/2000 | Bezos et al. | 705/27 |
| 6,058,373 A | * | 5/2000 | Blinn et al. | 705/26 |
| 6,064,979 A | * | 5/2000 | Perkowski | 705/26 |
| 6,154,738 A | * | 11/2000 | Call | 707/4 |
| 6,282,518 B1 | * | 8/2001 | Farrell et al. | 705/26 |
| 6,311,134 B1 | * | 10/2001 | Sorenson | 702/22 |
| 6,377,937 B1 | * | 4/2002 | Paskowitz | 705/26 |
| 6,405,175 B1 | * | 6/2002 | Ng | 705/14 |
| 6,539,372 B1 | * | 3/2003 | Casey et al. | 707/3 |

* cited by examiner

METHOD AND SYSTEM GENERATING QUERY FORM, ASSIGNING AND COMPARING RISK DESIGNATION OF CHEMICAL PRODUCT OVER A COMPUTER NETWORK FOR CHEMICAL PRODUCTS CUSTOMERS

This application claims the benefit of Provisional Application No. 60/201,046 filed May 1, 2000.

FIELD OF THE INVENTION

The present invention relates generally to a method and a system for on-line screening of chemical customers. More specifically, the present invention provides a method and a system for screening potential customers of chemical products prior to the purchase or procurement of the chemical products from chemical manufacturers and/or distributors. The screening process may entail querying a potential customer about the customer's level of safety with regard to the chemical products and making decisions concerning the distribution of the chemical products to the potential customer based upon the answers provided by the customers.

BACKGROUND OF THE INVENTION

After the catastrophe at the Union Carbide facility in Beaphol, India in the late 1970's, the chemical industry undertook a concerted effort to regain public credibility by demonstrating that they operate their business in a responsible manner to protect workers, the public, and the environment. In an effort to gain back public respectability and confidence and to reverse the trend of increased government control and intervention based upon environmental damage publicized as a result of chemical company activities/production, the Chemical Manufacturers Association ("CMA") implemented a self administered effort to demonstrate that the products that member companies produce and/or distribute are used in a responsible manner. The companies making up the CMA banded together to put in place a mechanism to ensure organizations buying their products exercise responsible behavior in using their products.

The principles by which member companies agreed they would conduct their activities became known as Responsible Care, with the specific guiding principles related to knowing details about the customers' use and knowledge for properly handling a product. This became known as the Product Stewardship code. It is but one of the guiding principles of Responsible Care, and it is one of the most difficult to comply with because it is 'customer facing,' meaning it requires scrutiny of the customer and how they use a product. The means by which this is done by the selling company is by making sure employees of companies that purchase hazardous products are trained in proper use and safeguards, by verifying that the neighboring community is afforded adequate protection by ensuring precautions and procedures are incorporated by the using company, and by ensuring that procedures employed by the company protect the environment.

As mentioned, this collaborative effort was initiated by member companies of the Chemical Manufacturers Association ("CMA"). The effort is known as Responsible Care, which soon became a prerequisite for membership to the organization, and became a guiding principle of the organization. Similarly, the National Association of Chemical Distributors ("NACD") created their own "responsible care" program called the "Responsible Distribution Process" ("RDP") to fulfill the same underlying philosophy. The CMA membership primarily consists of chemical manufacturers, while NACD's membership is primarily chemical distributors. Responsible Care/Responsible Distribution is also generally known as "Product Stewardship."

In practice, manufacturers and distributors have, through the years, met the Product Stewardship guiding principle of Responsible Care/Responsible Distribution through human contact with the 'customer'. Manufacturers and distributors relied upon their sales force to contact potential and existing customers, and informally make an assessment on the manner in which a company conducts its business. If a potential customer ran a questionable operation, there would be discussion about upgrading operating procedures of the facility. This has been, for the most part, a very informal process, with the ultimate decision not to sell to the customer because of poor Product Stewardship practices being the ultimate hammer. Thus, many of the decisions were made on a subjective basis by an 'on-site' person—sometimes a sales representative, other times a company driver making a delivery—that scrutinized the back-end operation and reported back to management of the selling organization. As time went on, the level of sophistication has improved, but the principle of human evaluation has continued with a great deal of subjectivity entering the process, with little in the way of consistent standards from supplier to supplier.

The advent of e-commerce brought about a new problem relative to Product Stewardship. Suddenly the human contact element was taken out of the picture. E-commerce brings the potential for the buyer and seller of a chemical product to never make physical contact with one another. The buyer comes to the seller's web-site and selects products; the e-commerce provider passes the order to a supplier who ships the product. There is no need for on-site contact. The potential exists for firms to not follow the guiding principles of CMA/NACD Product Stewardship. This is causing a great debate within the supplier and distributor communities: how to meet the intent of the Product Stewardship principles they have committed to with the respective organizations.

Therefore, an improved system and a method are necessary to allow buyers of products, such as, for example, chemical products, to purchase the products on-line, or otherwise via a computer network. Moreover, a system and a method are needed that screens a buyer of products that are hazardous to a potential user of the product or to the environment for particular information related to how the product is intended to be used and what precautions are in place to take care of emergencies related to the product. A decision may then be made to determine whether the product may be shipped to the buyer based on answers to the query.

SUMMARY OF THE INVENTION

The present invention relates to a system and a method of screening potential customers of chemical products for safe practices related to the chemicals they wish to purchase or otherwise obtain from manufacturers and/or distributors. A chemical customer may order chemical products on-line. The chemical products may be categorized based upon the degree of hazard they pose. A defined set of criteria may be applied to all products offered for sale by the company on its site. Products may be assigned a designation such as: 1) high risk, 2) low risk, 3) custom, or 4) no risk. The degree of screening of the customer prior to the sale is based upon the degree of regulation a product is given by some agency of the government (e.g. DEA, EPA, BATF, etc.), or the level of safety and environmental concern the product may pose to workers, the public, and the general environment.

Based upon the categorization of the product, a database system may be provided whereby the product, upon a first order by a given company and location, may provide an on-line questionnaire which requests specific information of the company relative to company employee practices (ensuring safety practices are in place), what facility precautions are in place at the facility (to ensure environmental and community protection), what permits are in place (for products requiring specific permits for use of the product), and an oath/declaration that the information provided is accurate. The initial order may not be processed until the questionnaire is submitted. Upon submission, the responses may be reviewed and approved or rejected. Questionnaires may be archived, with approvals placed on an "update schedule" whereby the initial responses may be returned to the ordering company to verify the information is still accurate after the specified period of time has elapsed.

It is, therefore, an advantage of the present invention to provide a system and a method for screening customers of hazardous products that ensure that the customers of the hazardous products have procedures in place for handling emergencies related to the products. Moreover, it is an advantage of the present invention to provide a system and a method for screening customers that ensure that information relative to the purchaser's preparedness to handle emergencies is gathered and stored prior to having the product shipped to the customer. Moreover, it is an advantage of the present invention to provide a system and a method for screening customers of products that allows the information to be reviewed by a reviewer using a particular set of criteria.

Further, it is an advantage of the present invention to provide a system and a method for screening customers of products that minimizes risks for the parties involved in ordering the products. Still further, it is an advantage of the present invention to provide a system and a method for screening potential customer of products that provides a degree of screening that is relative to the degree of hazard a particular product poses to users or to the environment.

And, it is an advantage of the present invention to provide a system and a method for screening potential customers of products that provides follow-up contact with customers to request information related to changed practices of the customer after a certain period of time has elapsed. In addition, an advantage of the present invention is to provide a system and a method for screening customers of products that automatically notifies a reviewer that a form has been submitted by a customer related to the customer's preparedness and practices in handling emergencies with the product.

Additional features and advantages of the present invention are described in and will be apparent from, the detailed description of the presently preferred embodiments and from the drawings.

BRIEF DESCRIPTION OF THE FIGURES

FIG. 2 illustrates a process that a reviewer or system administrator may use.

DETAILED DESCRIPTION OF THE PRESENTLY PREFERRED EMBODIMENTS

The present invention relates to a method and a system of on-line screening of customers of products. Preferably, the products are chemical products. The following outlines a system and a method for conducting a screening of a customer that may order one or more of a plurality of "flagged" products for the first time or for a location for the first time, known as a "product/location combination." A "flagged" product may be a product that has been designated as having a particular risk designation.

The basic principle of the screening process is that certain chemicals require a series of questions to be answered by the customer prior to the release of their first order of that product to a given location. The customer's responses to the questions must be reviewed (known as "stewardship review") and "approved" prior to the release of the order.

The present invention may have the following: the ability to present an appropriate screening form (on-line or otherwise) to a customer upon selection of a "flagged" product for purchase the first time. The possible forms to be presented may include: a) a high risk long form; b) a low risk short form; and/or c) a manufacturer's "custom" form. Of course, a product may be designated as being "no-risk", meaning that a form need not be submitted by the customer. However, any other risk designation may be utilized as may be apparent to one having ordinary skill in the art. The high-risk form may present questions requesting answers concerning particular uses of the product and may be presented when a particular product or chemical has a "high-risk" designation associated therewith. For example, the following information may be requested for products having a high-risk designation (of course, other questions may be asked that may be apparent to those skilled in the art):

1. Contact information including name, address, e-mail address, phone number and other information that may be utilized to contact the customer;
2. Customer plant location information and how long the customer has used the product being requested;
3. Whether a copy of an MSDS form for the product has been read and understood by the customer;
4. What kinds of training programs are in place at the facility providing workers information on the hazards associated with the product and how to safeguard against the hazards, including OSHA Hazard training, HAZWOPER certification, manufacture/supplier training, HM-126f training, or any other training apparent to one having ordinary skill;
5. Whether the attendance and satisfactory completion of the training program by an employee is documented;
6. Whether the training program contains a "refresher schedule" for review of hazard data to ensure that employees have the most current information;
7. Whether a plant Emergency Response Plan (ERP) is in place and is updated if changes occur, and whether employee instruction of the plan contents is conducted to familiarize employees with the contents of the ERP;
8. Whether emergency service providers (i.e., the fire department, local hospitals, etc.) are aware of the ERP of the facility and have been offered a copy;
9. Whether ERP drills are conducted on a regular basis to ensure preparedness;
10. Whether personal protective equipment is available to employees and whether use of the equipment is required by workers in areas where contact with the product may occur, and whether contact is through routine use or because of a system upset;

11. Whether a source of water (e.g. a hose, safety shower, eyewash, etc.) is present in product use and storage areas in the event of a mishap where a worker needs to flush the product from his or her body;

12. Whether control measures are in place to minimize the impact of an accidental spill during unloading, storage, or use (e.g. a means of blocking off drains (if present), absorbent and/or diking material available to contain spills, etc.), and whether the control measures and preparedness are adequate to prevent/minimize the potential impact to local waterways, sewers or public areas;

13. Whether the product is being used for legal and intended purposes;

14. What the end product being produced by the product ordered;

15. What registrations, permits or licenses the customer maintains for use, storage and/or handling of the product.

A low risk form may present questions requiring less detailed answers, or may present alternate questions than those presented in the high risk form ( as shown above) and may be presented when a customer orders products that have a low-risk designation. For example, the following questions may be asked when a product having a low-risk designation is ordered for the first time (of course, other questions may be presented as may be apparent to those having ordinary skill in the art):

1. Contact information including name, address, e-mail address, phone number and other information that may be utilized to contact the customer;

2. Customer plant location information and how long the customer has used the product being requested;

3. Whether a copy of the MSDS form for the product has been read and understood;

4. What kinds of training programs are in place at the facility providing workers information on the hazards associated with the product and how to safeguard against them, including OSHA Hazard training, HAZWOPER certification, manufacture/supplier training, HM-126f training, or any other training;

5. Whether the training program contains a "refresher schedule" for review of hazard data to ensure that employees have the most current information;

6. Whether the product is being used for legal and intended purposes;

7. What the end product being produced in which the product is used.

In addition, certain chemicals or other products may have particular characteristics that may not be addressed by the high-risk form for high-risk products or the low-risk form for low-risk products. Therefore, an alternate form may be necessary that may be custom-designed specifically for that product. These custom forms may be supplied directly by the manufacturer of the product or developed in association with the system administrator to be presented to a customer when a customer attempts to order the product. Any of the previous questions presented in either the long form or the short form, noted above, may be utilized in the custom from. Alternatively, other questions may be posed depending on the particular product. Further, custom forms may not be presented to be filled out on the customer's computer. A custom form may be presented to a customer and the customer may print the custom form out on his or her printer to fill out. Instructions may be included for faxing the custom form to a system reviewer, other administrator or back to the product manufacturer for stewardship review of the custom form. Of course, the custom form may be integrated into the system so that a customer could answer the questions presented on a custom form on the customer's networked computer in a fashion similar to the high-risk long form and low-risk short form, as presented herein.

Moreover, the present invention includes the ability for the customer to answer and submit the forms on-line from a web-site. The form may be completed once by the customer for a flagged product that is ordered for the first time product/location combination, or a flagged product wherein a certain period of time has elapsed since the first order of the flagged product. These forms may then be saved to a database to be recalled at a later time. Typically, subsequent orders of the same product to the same customer or location should not have any form presented upon subsequent orders of the same product/location combination. Follow-up screenings may be utilized to contact a customer after a certain period of time to request update information for any form the customer may have submitted when a product was ordered. Specifically, the customer may be presented with their answers to the particular form for the same product/location combination and may be given an opportunity to amend the answers. The form may then be submitted for review and saved in the database as a new and separate submission so a historical record may be kept of the customer's responses. Web-site capabilities to aid the customer in completion of the form may include the following:

a) "Drop Down" menus providing response alternatives;

b) "Auto-Fill" fields taking information from keyed/selected input previously provided (e.g. product in the shopping cart, company registration, etc.);

c) A "Thank You" and/or "next step" message may be displayed to the customer upon submittal of the completed form;

d) A completion check of the form, wherein a quick logic is run to ensure that all questions on the particular form have been addressed and/or answered; and e) Any other web-site capabilities that may be apparent to those having ordinary skill in the art.

Once the customer has answered the questions on the form for that particular flagged product and has submitted a response, the order may be placed "on-hold" until the questions submitted by the customer are reviewed by a system reviewer or other administrator, where it is "approved" or "rejected". Only approved responses will cause a release of the order for processing/shipment of the product to the customer.

Figure 1:
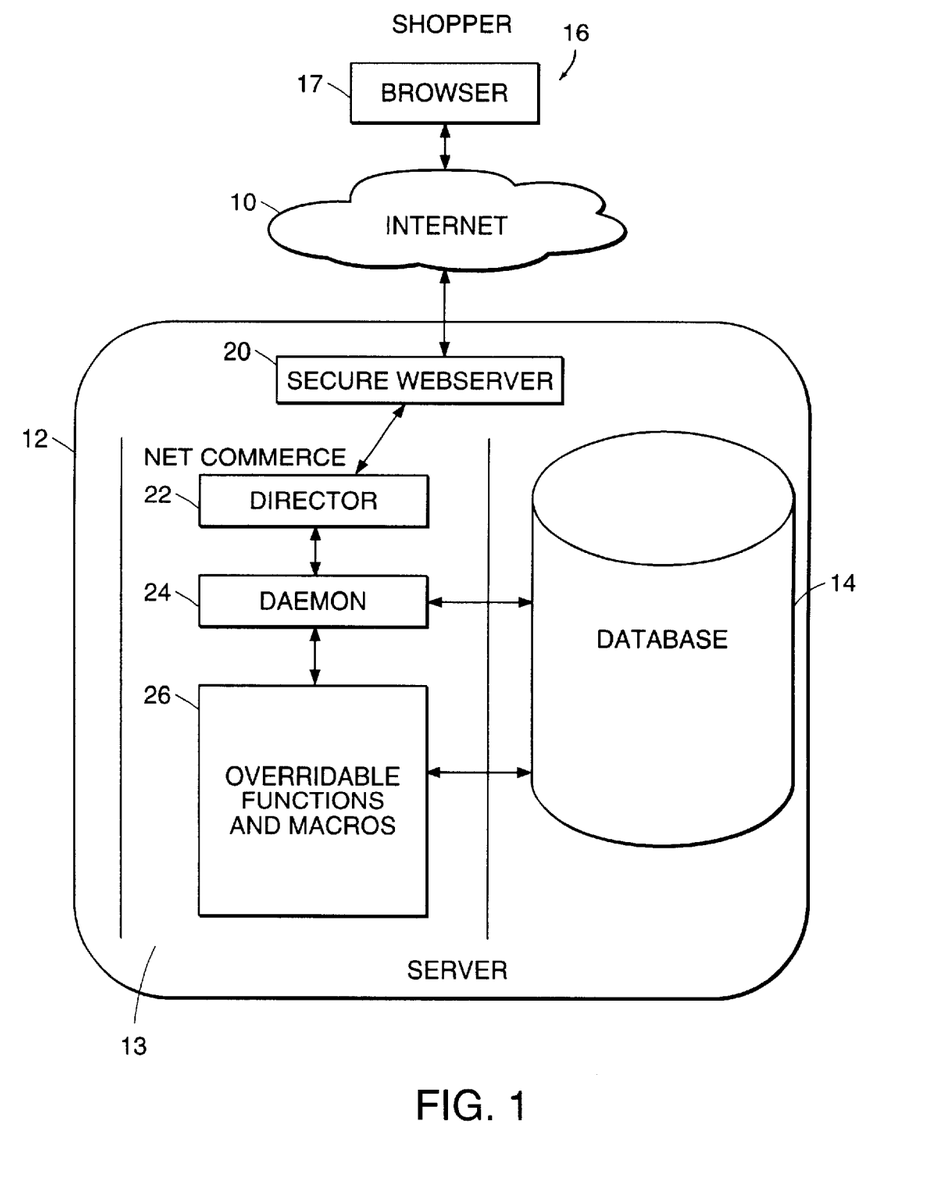
FIG. 1 illustrates a computer network having a plurality of computers interconnected therewith that may be utilized to operate a system used for the screening of customers when a customer orders a product having hazardous characteristics.

FIG. 1 generally shows how the present system 1 may be set up on a network 10 so as to be accessed by product customers, reviewers of submitted forms, and/or system administrators for inputting information and otherwise maintaining the system 1. The system 1 may comprise a main computer 12 that may be interconnected with a database 14 that may be utilized to store the information relating to each of the products that may be sold via the network 10. It should be noted that the main computer 12 may consist of a series of computers or processors and should not be limited as herein described. A plurality of networked computers 16 may be interconnected with the main computer 12 via the computer network 10 so as to gain access to the main computer 12 and the information contained on a database 14 via a browser 17. Any number of networked computers may be interconnected with the main computer 12 and the database 14 as may be apparent to one having ordinary skill in the art. A typical and well-known computer network that may be used in this invention is the Internet. However, other networks may be utilized as may be apparent to those having ordinary skill. The main computer 12 may present to the networked computers 16 user interfaces to gain access to the system.

As shown in FIG. 1, there are two discrete components of the system: the browser 17 at the customer end and the server framework 13. The customers may interact with the server 13 through a secure web server 20 via their browser 17 and may place online orders. At the server 13, the secure web server 20 redirects the customer's orders to a director 22. The director decides how these orders will be processed and then forwards these to the appropriate daemon 24, which performs the task associated with the commands and returns a response to the director 22. Tasks may be associated with respective overridable functions or macros 26, which are called in order to perform the actual order processing by an administrator.

Figures 2, 2A:
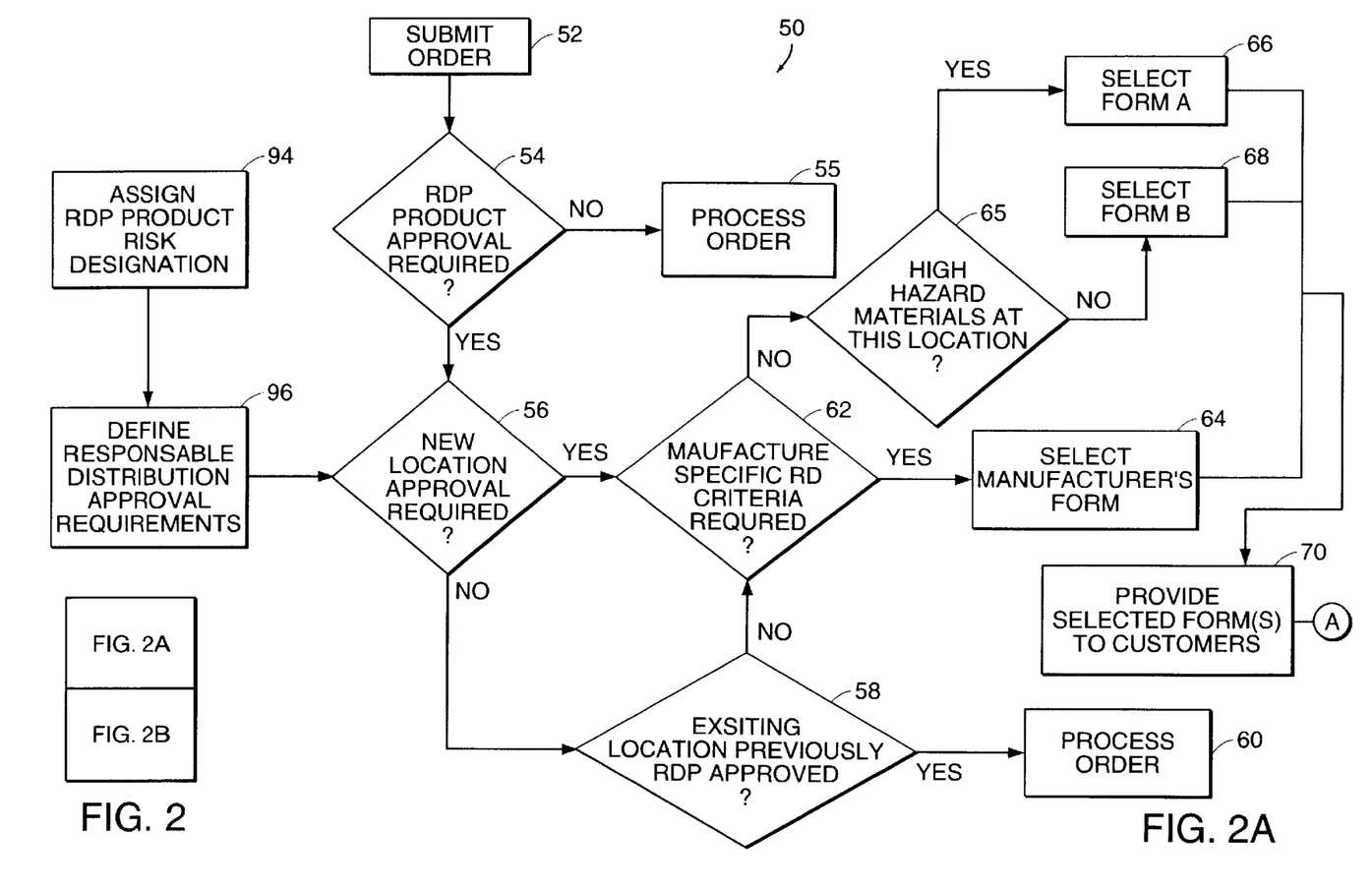
FIG. 2 illustrates a process that a customer may use to enter the system, order products via the network, and submit responses to screening forms that may be used by the seller to screen the customers. Moreover.
Figure 2B:
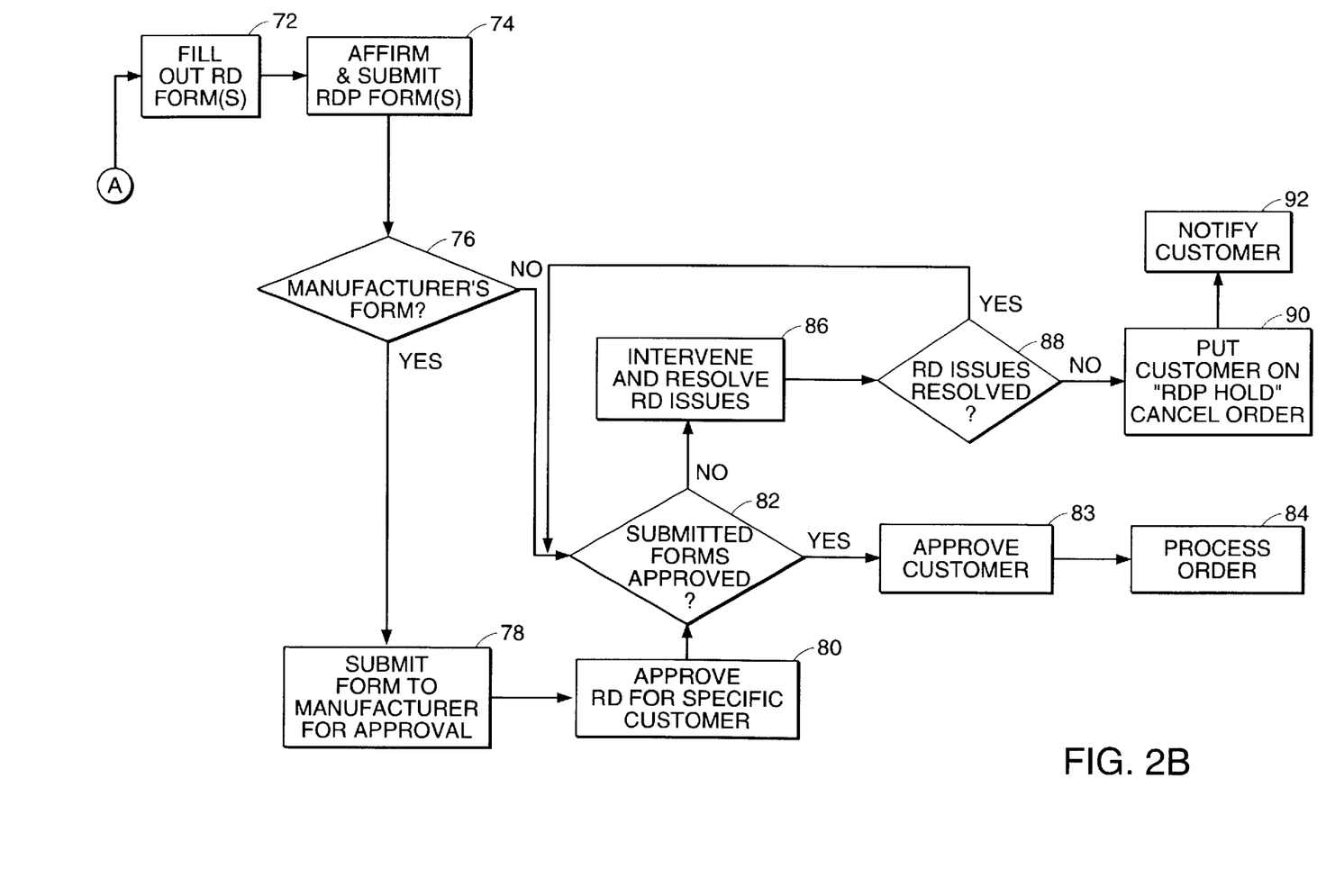

If one of the networked computers 16 is utilized by a customer desiring to procure a product for the first time or to procure a product for the first time at a new location, the customer may utilize the networked computer 16 to order the product and retrieve the required form via the network 10. For example, FIG. 2 shows a process 50 that a customer may use to access and order a chemical over a computer network, such as, for example, the Internet. If the network is the Internet, then the customer may input into the networked computer 16 the web address for ordering the products and may enter the portal to order the particular products. The customer may be presented with a customer interface. If the customer has never ordered a product previously, then the customer may choose to register. The registration may query the customer to input specific information to form a customer profile such as, for example, the customer name, address, and name of plants needing particular products and other information that may be apparent to one having ordinary skill in the art.

All of the possible products that may be sold via the system may be stored on the database 14, including information concerning each of the products and a product identifier, such as, for example, a SKU number, that may be referenced by the customer when the customer orders a product. Moreover, the products stored on the database 14 may be searchable by the customer if the customer is unsure whether the particular product is sold via the system. Moreover, a customer may be presented with a plurality of choices of manufacturers from whom to order the particular product. Information, such as price and availability of the product, may be presented to the customer. Moreover, information relating to the manufacturer may be presented to a customer if a customer chooses to inquire about the manufacturer. After a product has been identified, the order may be completed by indicating the quantity of the product that is desired by the customer via step 52 of the process 50. If the product is flagged as not needing review, as determined by decision box 54, then the order may be processed via step 55.

If the customer has ordered a product that is flagged for review (that the system determines via a decision box 54), meaning that the product has a particular risk designation associated therewith, then the logic of the system determines whether the flagged product is for a new delivery location of the customer via a decision box 56. If new delivery location approval is not required, the decision box 58 determines whether the flagged product has been previously stewardship-approved for the existing location. If yes, then the order is automatically processed via the process order step 60. However, if the flagged product for the existing location has not been previously stewardship-approved via the decision box 58, or new location approval is required via step 56, then decision box 62 determines whether the flagged product requires a custom form, depending on the risk designation of the flagged product. If a custom form is required, then a custom form is selected via step 64 and presented to the customer via step 70. However, if a custom form is not required, then decision box 65 determines whether the product has been designated as high-risk, requiring the high-risk long form to be selected via step 66 (designated as "Form A" in FIG. 2) and presented to the customer via step 70. However, if the product is not designated as high-risk, then the low-risk form may be selected via step 68 and presented to the customer via step 70 (designated as "Form B").

The customer may fill out the particular form via step 72 and may affirm and submit the responses to the questions presented on the particular form via step 74. The required form may have a certification means that may be utilized to provide a digital signature or other certification to show that the particular customer certifies the authenticity of the answers submitted on the form. The certification may include an oath or declaration that all submitted answers to questions are true, to the best knowledge of the signer of the oath or declaration. Moreover, the certification means may request information related to the individual that is providing the certification. The customer may then submit the form, preferably by hitting an "I accept" button.

After a required form is submitted by the customer, a notice may be sent to the reviewer thereby notifying the reviewer that a form has been submitted and awaits either approval or rejection of the order. The notice may be sent by any means appropriate. For example, after a customer has submitted a form, an e-mail message may be sent to the reviewer notifying the reviewer that the form is awaiting approval or rejection. Oftentimes, customers may submit a form that is incomplete or that otherwise lacks important information. In this circumstance, a notice may be sent to a reviewer, a customer service representative, or any other individual. The notice may indicate that the form submitted is lacking a particular piece of information, and that the order has been placed on hold until the information is submitted by the customer. Moreover, a notice may be sent to the customer automatically if the customer has submitted an incomplete form.

Decision box 76 determines whether the form submitted is a custom form or not. If the form submitted to the customer is a custom form, then the form may be submitted directly to the manufacturer for approval or rejection of the product order via step 78. The manufacturer may approve or reject the product order via step 80. Moreover, if the form submitted to the customer is not a custom form, as determined in decision box 76, then the form may be approved or rejected by a system reviewer.

To provide stewardship review of the form, the reviewer may access the form by entering the database via one of the networked computers 16 or the main computer 12. The networked computers 16 may further provide access to the forms by the reviewer if the reviewer enters a reviewer user name and password to access the site. Alternatively, the reviewer may access the database 14 by entering a different portal than the customer, such as via a different web address and by inputting a reviewer user name and password thereinto. After the reviewer has entered a user name and password, the reviewer may be presented with a user interface that may present options to the reviewer. Of course, the reviewer may gain access to the forms in any way that is apparent to one having ordinary skill in the art.

One of the options may allow the reviewer to retrieve the form from the database 14 that is awaiting approval or rejection. Typically, the forms that are awaiting approval or rejection will be compiled automatically to be viewed by the reviewer. Alternatively, the reviewer or other administrator may enter a distinctive identification code, or may otherwise search for the form on the database 14.

After a reviewer, or other administrator has retrieved the form to be reviewed, the answers to the form may be presented as entered by the customer. The reviewer may then review each answer to determine whether the order of the product to the customer may be approved. Preferably, to approve the order, an "I approve" button may be clicked by the reviewer.

If decision box 82 determines that the submitted form has been approved, then the order is processed via step 84. However, if the form submitted by the customer is not approved, then a reviewer and/or a customer service representative may contact the customer via step 86 and attempt to resolve the issues that kept the order from being approved. In addition, the answers on the form may be changed by the reviewer if necessary. For example, it may become apparent to a reviewer that the customer has misread, or otherwise misinterpreted a question on the form. The reviewer may contact the customer and request another answer to the question. If the answer changes, then the reviewer may so indicate the new answer on the form that the reviewer is reviewing. Moreover, a space may be provided on the form that the reviewer is reviewing for comments to be added to the form if desired by the reviewer.

If the form is changed by the reviewer, then the reviewer may save the form into the database. Preferably, the changed form does not replace the form submitted by the customer, but is saved as a separate document so that the original submission by the customer may still be viewed, if necessary.

If a reviewer has received notice that the customer has submitted a form that is incomplete, the reviewer may contact the customer and inform the customer of this fact. In addition, the reviewer may provide "temporary approval" of the product ordered by the customer while the customer attempts to enter the information that is required to complete the required form.

If the issues are resolved via decision box 88, then decision box 82 may determine that the form has been approved. If the form is approved, then customer may be approved via step 83 and the order may be processed via step 84. However, if the issues are not resolved by contact with the customer via decision box 88, then the particular form is placed on hold and the order is cancelled via step 90. If an order is cancelled, then the customer may be automatically notified via step 92. Alternatively, a customer service representative may be notified and may contact the customer via step 92 to inform the customer of the cancellation of the order.

After the required form has been submitted by the customer, then the customer may choose to log out of the system or may start over and order a different product. If the next product requested by the customer is ordered for the first time and has a particular risk designation associated therewith, then the customer may be presented with and may submit another form as required by the risk designation. Alternatively, the customer may place an order for all the products at once and the system may then determine which products may have a risk designation associated therewith, and further may group the products according to a group risk designation. Therefore, the customer may be presented with a single form for each group of products. For example, if a customer orders ten products and three require the high-risk form, and seven require the low-risk form, then a single high-risk form will be presented to the customer having the three products presented thereon. The particular questions presented on the high-risk form will be particular to each of the three high-risk products. Therefore, a customer will not have to go through the process 50 for each product ordered by the customer. Moreover, each form presented may have an introduction banner that may change depending on the products that have been ordered by the customer. Typically, the introduction banner will indicate the particular products that the customer has ordered.

The reviewer, or other system administrator may have access to the system, as described above, by entering the system via another portal, such as, for example, by entering an alternate website, or entering a different web address. The reviewer or system administrator may enter a user name and password to enter the system. Not only can the reviewer or administrator enter the system to retrieve and review submitted forms, but the reviewer or administrator may flag products for assigning risk designations to the products via step 94. Preferably, the administrator may review the products contained within the database 14 and may be presented with an option to assign a risk designation to the product. Moreover, groups of products, if related, may be assigned together if the groups share similar hazard characteristics. Moreover, the administrator may change the risk designation that is currently assigned to a product, if desired. For example, a product designation may change due to regulations imposed by the government, or some other regulatory body, that may change. For example, if a particular product has been designated as low-risk, but the federal government has imposed more stringent regulations due to research of the product or for any other reason, then the risk designation may be changed to high-risk. An option may allow the reviewer or administrator to change the designation and to save the new designation into the database 14. The user interface may allow the reviewer or administrator to search the records of the database for particular products and review the designations, and other information, associated with those products.

The reviewer or administrator may further have the ability to enter the system and "disapprove" a previously approved product and/or customer location. This ability is necessary in the event a user of the invention becomes aware of a problem with a customer's use of a product.

Of course, the administrator may be allowed to enter the database and change the forms presented based on the risk designations of the products. The particular questions presented on each form may be changed, depending on changed circumstances. This may be accomplished via step 96.

Moreover, the reviewer or administrator may have the ability to target a specific customer group for sending "update surveys" to the customer of a particular product. Potential criteria for conducting updates may include "product used" and "elapsed time" since completion of the original survey. Further, other criteria may be used that may be apparent to those skilled in the art. In other words, each product may have an "elapsed time" designation associated therewith. If a particular amount of time has elapsed since the customer had received approval of the product, then a form may be submitted automatically to the customer for the customer to enter information relating to any changed circumstances.

For example, because operating practices and situations at a customer location can change (e.g. personnel leave or are transferred, physical arrangements and equipment in a plant change, etc.) it may be prudent to revisit and/or validate a customer's original information. When appropriate, update information will need to be obtained from the customer, and the records of the customer in the database 14 may be updated. The updated information may be saved as a separate file from the original information so that a record may be kept of the customer and may be saved within the database 14.

In addition, the reviewer or administrator may have the ability designate that certain customers that may be ordering products from certain manufacturers have been pre-approved by the manufacturers or distributors of the products, and therefore, can bypass having to fill out the required forms for a certain period of time. Preferably, the period of time may be designated and associated with the customer or the particular location of the customer. When the period of time expires, then the forms may be submitted to the customers upon ordering flagged product/location combinations.

Moreover, a search feature may be provided to the administrator for searching the records that may be contained on the database 14 for any particular information that may be apparent to one having ordinary skill in the art. For example, the reviewer or administrator may desire to know of all the products that may be ordered for a particular customer within certain dates. The search feature may allow the reviewer to get this information from the database 14. The search feature may be set-up and utilized in any way that may be apparent to one having ordinary skill in the art.

Other options may be presented to the reviewer or administrator for otherwise maintaining the system as may be apparent to those having ordinary skill in the art. This invention is meant to encompass these options, and should not be limited as herein described.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A method of screening product customers over a computer network, the method comprising the steps of:
   providing a portal having a user interface on a computer network for ordering at least one product by a customer from a plurality of products;
   providing a product database containing information for the plurality of products, each of the products having a risk designation, and the product database being interconnected with the portal;
   receiving an order through the portal from the customer via the user interface for the procurement of at least one of the plurality of products;
   in response to a customer order, generating a query form for response by the customer for screening purposes based on the risk designation of the product; and
   allowing the procurement of the product conditioned on response of the customer to the query form compared to the risk designation of the product.

2. The method of claim 1 wherein the plurality of products are chemical products.

3. The method of claim 1 wherein the product database contains a plurality of query forms wherein the query forms correspond to particular risk designations of the products.

4. The method of claim 3 wherein the step of generating a query form includes:
   presenting the query form that corresponds to the particular risk designation of the product.

5. The method of claim 1 wherein the query form presents questions to the customer related to the customer's preparedness in handling an emergency with the product.

6. The method of claim 1 wherein the risk designation of the product may be assigned.

7. The method of claim 6 wherein the assigned risk designation may include one of: high-risk, low-risk, custom risk and no risk.

8. The method of claim 7 wherein the step of generating a query form includes:
   presenting a high-risk designation query to the customer if the customer is attempting to procure a product having a high-risk designation or presenting a low-risk designation query to the customer if the customer is attempting to procure a product having a low-risk designation.

9. The method of claim 1 further comprising the step of:
   providing a means for a customer to positively affirm that responses of the customer to the query form are correct.

10. The method of claim 1 further comprising:
    sending to a customer database the customer's response to the query form as a completed query form for review by a reviewer.

11. The method of claim 10 further comprising the step of:
    notifying the reviewer when a query form is submitted to the customer database.

12. The method of claim 10 further comprising the step of:
    notifying the customer after a query form is reviewed by the reviewer.

13. The method of claim 10 further comprising the step of:
    providing an administrator interface that allows access to the product database and customer database by an administrator or the reviewer.

14. The method of claim 13 further comprising the step of:
    retrieving from the customer database the completed query form of the customer for review by the reviewer.

15. The method of claim 13 further comprising the step of:
    assigning risk designations to the plurality of products by the administrator or the reviewer; and
    saving the risk designations of the plurality of products in the product database.

16. The method of claim 1 further comprising:
    determining if the customer had previously responded to a query form corresponding to a particular product; and
    allowing the procurement of the product if the previous response meets certain criteria.

17. The method of claim 16 further comprising:
    sending a new query form to the customer if a previous response did not meet the criteria.

18. A computer readable media, comprising:
    instructions for execution on a processor for the practice of the method of claim 1.

19. A system for screening customers of products, the system comprising:
    a portal on a computer network having a user interface for ordering at least one of a plurality of products by a customer;

a database interconnected with the portal wherein the database contains information for the plurality of products and further wherein each of the products has a risk designation; and means for querying the customer with a query when a customer places an order for at least one product based on the risk designation of the product, wherein a comparison of the answers to the query with the risk designation of the product determine whether the customer may procure the at least one product.

20. The system of claim 19 wherein the user interface allows access by the customer to order a product from at least one product distributor.

21. The system of claim 19 wherein the products are chemical products.

22. The system of claim 19 wherein the query requests information from the customer related to the level of the customer's preparedness at handling an emergency with the product.

23. The system of claim 19 wherein the risk designation of the products may be assigned to the products.

24. The system of claim 23 wherein the assigned risk designations may include one of: high risk, low risk, custom risk, and no risk.

25. The system of claim 19 further comprising:

an administrative interface for an administrator of the portal and the database wherein the administrative interface provides access to the database for assigning risk designations to the products.

26. The system of claim 19 further comprising:

an administrative interface for a reviewer or an administrator of the portal and the database, wherein the administrative interface provides access to the database for reviewing the answers to the query.

27. The system of claim 19 further comprising:

means for notifying a reviewer when a customer's answers to a query has been submitted to the database.

28. The system of claim 19 further comprising:

means for notifying a customer when a reviewer either approves or rejects the order of the product based on the answers to the query.

29. The system of claim 19 further comprising:

means for notifying a product seller's representative when a reviewer rejects the order of the product based on the answers to the query.

30. The system of claim 19 further comprising:

means for the customer to affirm that answers to the query are correct.

\* \* \* \* \*